United States Patent
Fadler et al.

(10) Patent No.: US 6,707,202 B2
(45) Date of Patent: Mar. 16, 2004

(54) SLEEVE AND BEARING THAT LOCATE A ROTATING COMPONENT AND A MACHINED SURFACE OF A ROTARY DEVICE

(75) Inventors: Richard J. Fadler, St. Charles, MO (US); George D. Trost, Oxford, MS (US); Carl R. Fischer, South Bend, IN (US); Michael C. Torbit, Swansea, IL (US)

(73) Assignee: Emerson Electric Co., St. Louis, MO (US)

( * ) Notice: Subject to any disclaimer, the term of this patent is extended or adjusted under 35 U.S.C. 154(b) by 56 days.

(21) Appl. No.: 10/112,912

(22) Filed: Mar. 29, 2002

(65) Prior Publication Data

US 2003/0184169 A1 Oct. 2, 2003

(51) Int. Cl.[7] .................................................. H02K 5/00
(52) U.S. Cl. .......................................... 310/91; 310/89
(58) Field of Search .............................. 310/91, 87, 88, 310/89, 85, 86, 90

(56) References Cited

U.S. PATENT DOCUMENTS 3,749,528 A * 7/1973 Rousseau et al. ......... 417/423.4
6,359,353 B1 * 3/2002 Bevington ................... 310/87

* cited by examiner

*Primary Examiner*—Thanh Lam
(74) *Attorney, Agent, or Firm*—Thompson Coburn LLP

(57) ABSTRACT

With a motor having a motor housing and a motor shaft, a sleeve of predetermined length is mounted on the motor shaft with a proximal end of the sleeve engaging against a bearing that is mounted in the motor housing and supports the shaft for rotation. The bearing and the sleeve function to simplify the construction of the motor by eliminating a retainer ring and its associated annular groove from the shaft that were previously necessary to hold the shaft and bearing in relative positions, and by eliminating an additional retainer ring and its associated annular groove from the shaft that were used as a locator to positively locate a machined surface on the motor housing relative to the shaft and to positively locate a rotating component on the end of the shaft.

27 Claims, 2 Drawing Sheets

SLEEVE AND BEARING THAT LOCATE A ROTATING COMPONENT AND A MACHINED SURFACE OF A ROTARY DEVICE

BACKGROUND OF THE INVENTION (1) Field of the Invention

The present invention pertains to a bearing supporting a rotating shaft of an electrical device, for example an electric motor, and a sleeve that is mounted on the shaft in engagement with the bearing. Together the bearing and sleeve function to simplify the construction of the electrical device by eliminating one of a pair of retaining rings from the shaft that was previously necessary to hold the shaft and bearing in relative positions, and by eliminating a second retaining ring from the shaft that was used as a locator to positively locate a machined surface on the housing of the electrical device relative to the second ring and to positively locate a rotating component on the end of the shaft.

(2) Description of Related Art

In home appliances that employ water pumps driven by electric motors, for example dishwashers or clothes washers, the housing of the water pump is often mounted against the housing or end shield of the motor to reduce the amount of the interior area of the appliance that is occupied by the water pump and motor. In addition, mounting the pump housing against a portion of the motor housing positively locates the pump relative to the motor and positively locates the motor shaft in the pump housing interior. Proper positioning of the pump housing relative to the motor and the motor shaft is necessary to insure that the pump impeller mounted on the motor shaft inside the pump housing is properly positioned relative to the pump housing interior surfaces to prevent the pump impeller from contacting with the pump housing interior surfaces on operation of the pump and possibly seizing up the pump.

In order to insure that a pump housing and a pump impeller contained in the pump housing are both properly positioned relative to each other when the pump housing and pump impeller are assembled to the motor, the motor shaft is often used as a reference point in positioning a machined surface on the electric motor housing against which the pump housing seats. The motor shaft is also used as a reference point for the impeller of the pump, to properly position the impeller in the interior of the pump housing. Thus, the motor shaft is used as a reference point to properly position both the pump housing relative to the motor housing and to properly position the impeller relative to the pump housing interior for proper operation of the water pump.

One example of a prior art electric motor 12 is shown in FIG. 1. The particular construction of the electric motor 12 is typical of most electric motors and therefore the construction is shown schematically and only one end of the electric motor, the end from which the motor shaft 14 extends, is shown in FIG. 1. The motor is shown positioned with the motor shaft 14 oriented vertically. The motor could also be positioned with the shaft 14 oriented horizontally. The motor in FIG. 1 is an open-frame construction type of motor having a pair of end shields 18, only one of which is shown in FIG. 1, secured to opposite axial ends of the motor. The end shield 18 shown in FIG. 1 has a shaft opening 22 at its center. The two end shields are secured to axially opposite ends of the motor stator core 24 covering over the stator winding end turns 26. The rotor 28 of the motor is mounted on the motor shaft 14 and is positioned in the interior bore of the stator core 24. The shaft 14 is supported at its axially opposite ends by a pair of bearings mounted in the end shields. FIG. 1 shows only one of the bearings 32 mounted in the shaft opening 22 of the motor end shield.

The motor 12 is shown in FIG. 1 positioned with its shaft 14 oriented vertically where the shaft rotates a rotary component of a home appliance, for example an impeller of a pump in a dishwasher or clothes washer. In order to use the motor shaft 14 as a point of reference for locating machined surfaces on the housing of the motor 12 and for locating the pump housing and pump impeller relative to the shaft, it is necessary that the shaft 14 not move axially (i.e. in a direction along the shaft center axis 34) relative to the motor. In the prior art solution to prevent axial movement of the shaft 14, a pair of annular grooves 36, 38 are machined in the shaft. The grooves 36, 38 are positioned on the shaft an axial distance from each other that corresponds to the axial width of the bearing 32. With the shaft grooves 36, 38 positioned on opposite sides of the bearing 32, retainer rings, for example C-type retainer rings or E-type retainer rings 42, 44 are pressed into the two shaft grooves 36, 38 on opposite sides of the bearing 32 to secure the shaft in its axial position relative to the bearing. This in turn secures the shaft 14 in its axial position relative to the motor 12. This enables use of the shaft 14 as a reference point for locating a machined seating surface on the housing of the motor 12 when the motor is used with a pump, and for locating a rotating component of the pump, for example the impeller, relative to the shaft and the pump housing.

To locate the pump housing and pump impeller relative to the shaft 14, a third annular groove 46 is formed in the shaft and an additional retainer ring 48 is inserted into the groove. The additional retainer ring 48 is used as a point of reference to positively locate the pump impeller 52 relative to the shaft, relative to the end shield 18 of the motor 12, and relative to the pump housing. With the impeller 52 positively located relative to the shaft 14 and the motor 12, and the proper position of the impeller relative to the pump housing being known, the additional retainer ring 48 is used as a point of reference for positively locating a machined surface 54 on the end shield 18 of the motor 12 to serve as a seating surface with the pump housing 56 (represented by dashed lines in FIG. 1). Thus, the additional retainer ring 48 serves the dual purpose of positively locating the pump impeller 52 on the shaft 14 and positively locating the machined surface 54 on the motor end shield 18 that is then used to properly locate the pump housing 56 relative to the motor shaft 14.

However, problems were encountered in the above-described apparatus and method of locating the pump impeller 52 and locating the machined surface 54 relative to the motor end shield 18. In assembling the impeller 52 on the end of the motor shaft 14, the impeller would often be rotated on the shaft as it was pressed downward over the top end of the shaft as shown in FIG. 1. Rotating the impeller 52 as it was pressed downwardly onto the shaft 14 would at times cause the third retainer ring 48 to become dislodged from its shaft groove 46. This would result in the impeller 52 being improperly positioned on the shaft 14. The improperly positioned impeller would contact the interior of the pump housing when rotated by the motor which would detract from the proper operation of the pump. In addition, in using the third retainer ring 48 as a locator for machining the seating surface on the motor end shield, the motor would typically be mounted on a mandrill with an indexing part of the mandrill engaging against the third retainer ring. The engagement of the mandrill indexing part with the third retainer ring would positively locate the plane of the machined seating surface to be formed on the motor end shield. The machined surface would be cut or ground into the cast metal of the end shield relative to the position of the third retainer ring 48 on the motor shaft. The third retainer ring 48 becoming dislodged from its shaft groove 46 would result in the seating surface machined on the motor housing being improperly positioned. As a result, the pump housing would be assembled in a misaligned position on the motor end shield 18, presenting the potential for the impeller 52 contacting with the pump housing interior and seizing up.

SUMMARY OF THE INVENTION

The present invention overcomes the disadvantages associated with using a retainer ring as a locating device for positively locating a rotating component on a rotary shaft and for positively locating a machined surface relative to the rotary shaft. The present invention provides a tubular sleeve spacer that is positioned on the shaft of the rotary device between one of the bearings supporting the shaft and the rotating component mounted on the shaft.

In the description of the invention to follow, the terms "rotary device" and "rotating component" are used to broadly describe the environment in which the invention may be used. In the preferred embodiment, the "rotary device" is an electric motor used in a home appliance. The electric motor drives a water pump of the home appliance. Thus, in the preferred embodiment of the invention the "rotating component" is an impeller of the appliance pump. It should be understood that the concept of the invention may be employed in operative environments other than that disclosed in describing the preferred embodiment of the invention. For example, the "rotary device" could be some other type of motor or other type of electrical device, for example a generator. In addition, the "rotating component" could be some other type of component rotated with the shaft, for example a fan or pulley. Therefore, although the invention is described as being employed in the environment of an electric motor and a pump impeller driven by the motor, it should be understood that there are other equivalent operative environments in which the invention is equally well suited for use.

In use of the sleeve spacer of the invention, two of the annular grooves in the shaft and their associated retainer rings that are employed in the prior art apparatus and method described above are eliminated. Only a single annular groove is formed in the shaft of the motor, the groove being the bottommost of the three grooves formed in the vertically oriented motor shaft of the prior art shown in FIG. 1. A retainer ring is inserted into the bottommost groove and the ring engages directly with the bottom of the bearing mounted on the motor housing end shield. What is meant by "engages directly" is that the retainer ring is in direct contact with the bearing and there are no other intervening component parts positioned between the retainer ring and the bearing.

The spacer sleeve of the invention is then positioned over the top end of the shaft. A bottom, proximal end of the sleeve engages directly against the opposite side of the bearing from the retainer ring. This positions the opposite upper, distal end of the spacer sleeve vertically above the sleeve proximal end. The direct engagement of the sleeve proximal end on one side of the bearing and the direct engagement of the retainer ring on the opposite side of the bearing positively locates the sleeve distal end relative to the motor housing end shield and the shaft. What is meant by "positively locates" is that the position of the sleeve distal end relative to the motor housing and the shaft is a predetermined distance or length from the bearing mounted in the end shield. The position of the bearing mounted in the end shield of the motor housing is a predetermined or set position determined by the dimensions of the bearing and the recess provided in the end shield for the bearing, as well as the dimensions of the end shield itself. With the length of the sleeve between its opposite proximal and distal ends being a set or predetermined length, engaging the sleeve proximal end directly against the bearing positions the opposite distal end of the sleeve the predetermined distance from the bearing and thereby positively locates the sleeve distal end at a predetermined distance from the motor housing end shield. Thus, the spacer sleeve distal end provides a reference point for positively locating a machined surface on the end shield which can be used to engage with a housing of a pump driven by the motor to positively locate the pump housing relative to the motor and the motor shaft. The spacer sleeve distal end also provides a reference point for positively locating the rotating component, or impeller, of the pump.

The impeller is assembled onto the end of the shaft with the impeller (or a washer associated with the impeller) engaging directly with the sleeve distal end, thereby positively locating the impeller or other rotating component relative to the shaft and relative to a pump housing assembled to the motor. Because the tubular sleeve engages around the motor shaft, and the proximal end of the sleeve engages directly with the bearing supported in the motor end shield, assembling the pump to the motor and, in particular, the pump impeller to the end of the motor shaft, will not displace the sleeve relative to the shaft or the motor housing.

Thus, the spacer sleeve of the invention eliminates the problem of a retainer ring coming out of its shaft groove as the pump impeller is assembled onto the shaft. It also eliminates the possibility of the impeller becoming improperly positioned in the pump housing, and eliminates the possibility of the machined surface on the motor housing being incorrectly positioned which could result in the pump housing being improperly positioned relative to the motor shaft. The spacer sleeve also functions to retain the end shield bearing in place on the motor shaft and eliminates two annular grooves and their associated retainer rings previously needed on the shaft, resulting in a cost reduction in manufacturing the motor.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 1:
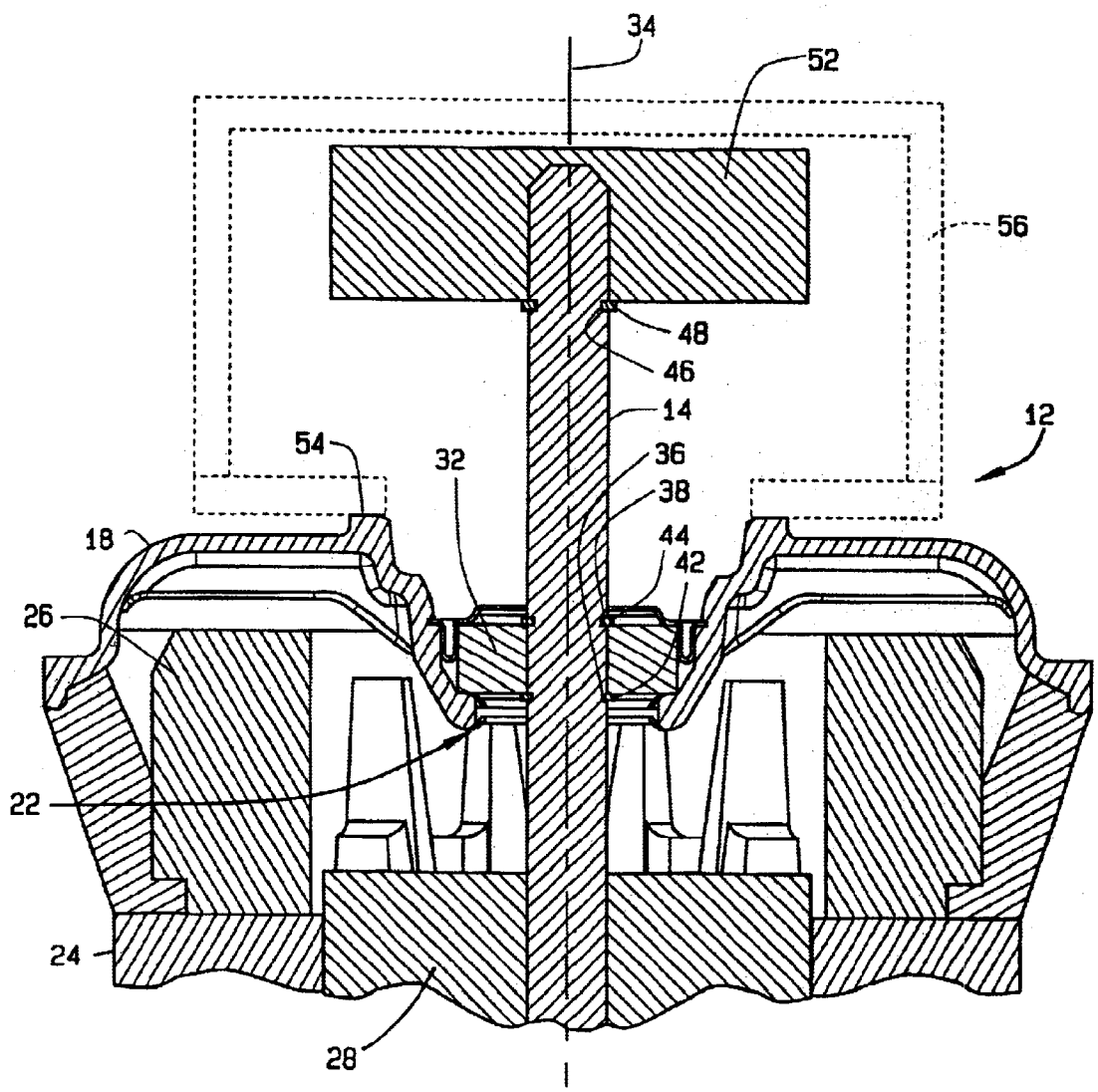
FIG. 1 is a partial, side sectioned view of a prior art rotary device, for example an electric motor, employing three annular grooves on the motor shaft and their associated retaining rings to positively locate a machined surface on the motor end shield and positively locate a rotating component, for example a pump impeller, on the shaft.
Figure 2:
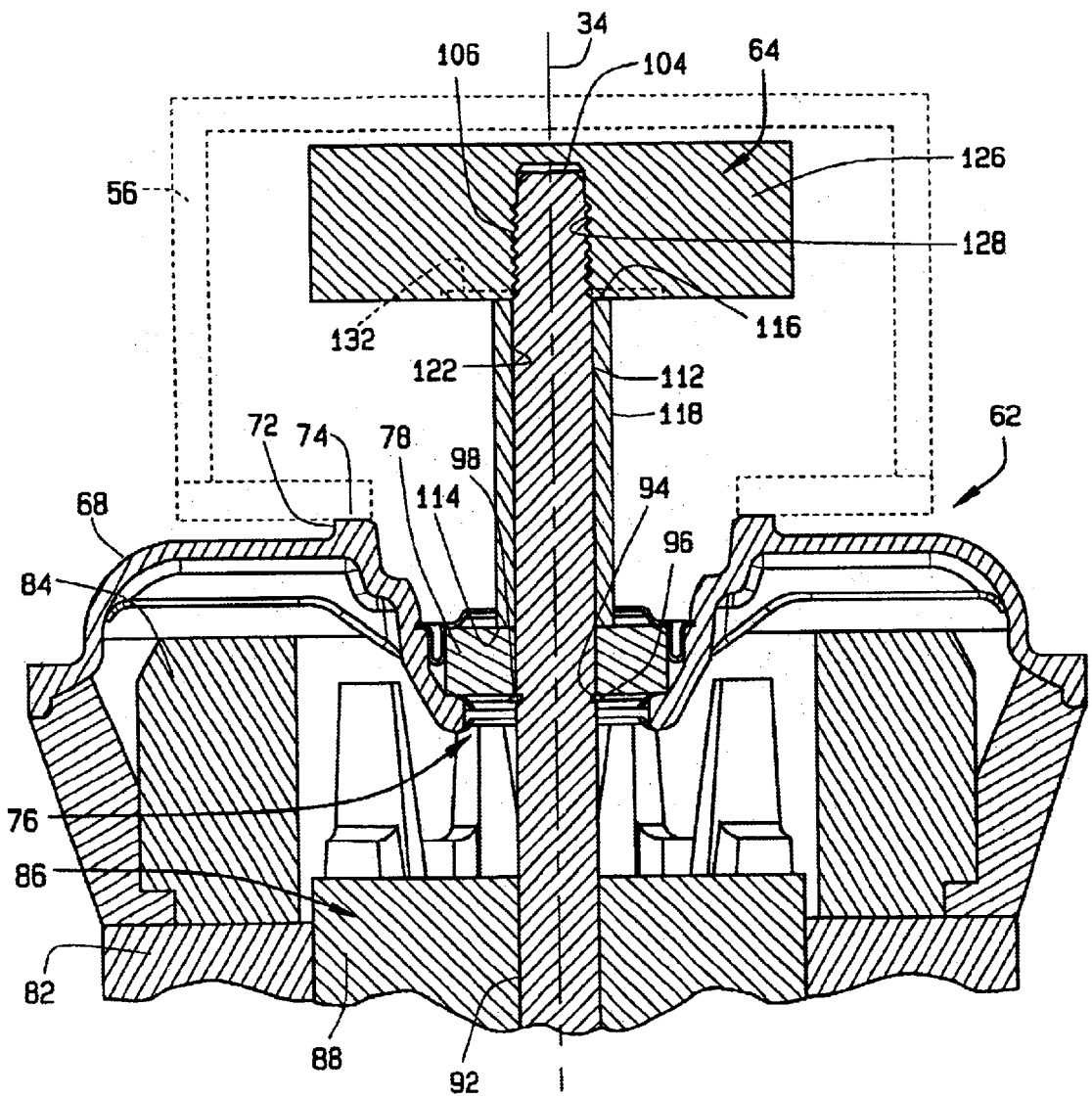
FIG. 2 is a partial, side sectioned view of the spacer sleeve of the invention that positively locates a rotating component on the rotary device and positively locates a machined surface on the rotary device.

In the apparatus of the invention and its method of use, two of the annular grooves in the shaft and their associated retainer rings that are employed in the prior art apparatus and method described above are eliminated. Only a single annular groove is formed in the shaft of the rotary device, the groove being the bottommost of the three grooves formed in the vertically oriented shaft of the prior art shown in FIG. 1. FIG. 2 shows the illustrated environment employed in explaining the apparatus of the invention and its method of use. FIG. 2 basically shows the same rotary device or electric motor and the same rotating component or pump impeller shown in FIG. 1, but incorporating the novel subject matter of the invention. The subject matter of the invention is described as being used with a "rotary device" or an electric motor 62 and with a "rotating component" or an impeller 64. Electric motors and impellers are well known in the prior art and therefore the component parts of the motor 62 and the impeller 64 are shown only schematically in FIG. 2. As explained earlier, the environment of FIG. 2 is only one illustrative environment in which the subject matter of the invention may be employed, and the invention is equally well suited for use in other equivalent environments. Because the motor 62 and impeller 64 are known, they will be described only generally.

The electric motor 62 shown is an open frame motor having a pair of end shields 68 (only one of which is shown in FIG. 2) connected to axially opposite ends of the motor. However, the apparatus of the invention could be employed in other types of motor constructions. In the illustrative embodiment, the end shields 68 are constructed of cast metal. Because the end shields 68 are cast, it is necessary that a surface of the end shield be machined with a smooth machined surface to provide an optimal seating surface for the pump housing 56 on the end shield. The end shield 68 shown in FIG. 2 is cast with a collar 72 having an annular end surface. The collar end surface is slightly rough when cast, but is machined after casting by a grinding or cutting operation performed on the end shield 68. The machining operation produces a flat annular surface 74 that is well suited for use in positioning another component used with the motor 62, for example the water pump of a home appliance.

Centered inside the machined, sealing surface 74 of the end shield 68 is the shaft opening 76. A bearing 78 is mounted inside the end shield shaft opening 76. A second bearing (not shown) is mounted in the opposite end shield (not shown) of the motor housing.

A portion of the stator core 82 and its winding end turns 84 are shown in FIG. 2. The motor end shields 68 are secured to the axially opposite ends of the stator core 82. The stator core has a center bore 86 that receives the rotor 88 for rotation of the rotor within the bore as is conventional. The rotor 88 of the motor is mounted on the shaft 92 for rotation with the shaft.

The motor shaft 92 of the invention shown in FIG. 2 is modified from the prior art motor shaft described earlier. The shaft 92 is mounted in the motor housing by the pair of bearings 78 (only one of which is shown in FIG. 2). The shaft 92 has only one annular groove 94 formed in the shaft, eliminating the two additional annular grooves formed in the shaft of the prior art. A conventional retainer ring 96 is snap fit into the shaft groove 94. The retainer ring 96 mounted in the shaft groove 94 provides a ring surface 98 on the shaft that engages directly with one side of the shaft bearing 78. The engagement of the ring surface 98 with the bearing 78 mounted in the motor housing end shield 68 prevents the shaft 92 from moving axially upward (in a direction along the shaft center axis 34) out of the motor housing as viewed in FIG. 2. The shaft distal end 104 or top end of the shaft as viewed in FIG. 2 is provided with means for attaching a rotating component to the shaft. In the illustrative embodiment shown in FIG. 2, the shaft top end 104 is provided with external screw threading 106 that is designed to mate with internal screw threading of a rotating component to be mounted on the shaft. Other means of attaching the rotating component to the distal end of the shaft may also be employed.

A spacer 112 in the form of a tubular sleeve is mounted over the shaft distal end 104. The sleeve 112 can be constructed from plastic, nylon or metal, dependent on the requirements of the particular application of the sleeve. The spacer 112 has opposite proximal 114 and distal 116 ends and a length 118 between its ends that is predetermined or set, depending on the electric motor with which the spacer is used and the rotating component with which the motor is used. The spacer sleeve has an interior bore defined by a cylindrical interior surface 122 of the sleeve. The interior surface 122 has an interior diameter that is dimensioned so that the shaft 92 can be easily extended through the interior bore with the interior surface 122 engaging in a sliding engagement around the shaft. The sliding engagement of the sleeve interior surface 122 around the shaft 92 limits or minimizes any radial movement of the sleeve relative to the shaft that could detract from the tolerances of the machined surface produced on the motor housing relative to the sleeve and the positioning of the rotating component relative to the sleeve, as will be explained. The spacer sleeve 112 is positioned on the motor shaft 92 with the sleeve proximal end 114 engaging directly with the bearing 78 on the opposite side of the bearing from the retainer ring 96 mounted on the shaft. Thus, with the bearing 78 securely mounted in the end shield 68 of the motor housing, with the width or axial dimension of the bearing 78 being known, and with the length 118 of the sleeve being predetermined to best suit the sleeve for use with the particular electric motor and rotating component used with the motor, the sleeve distal end 116 can be used as a point of reference for locating the machined surface 74 on the motor end shield 68 and for positioning a rotating component on the shaft 92 relative to the machined surface.

As in the prior art, the motor with the sleeve 112 mounted on the motor shaft 92 would be mounted on a mandril with an indexing part of the mandril engaging against the distal end 116 of the sleeve. The engagement of the mandril indexing part with the sleeve distal end 116 positively locates the desired position of the plane of the machined seating surface to be formed on the motor end shield 68. The machined surface 74 is cut or ground into the annular collar 72 of the motor end shield 68 and is positively located on the end shield by reference to the sleeve distal end 116. With the machined surface 74 formed in the end shield, assembling the pump housing 56 to the motor end shield 68 in engagement with the end shield machined surface 74 positively locates the position of the pump housing 56 and the pump housing interior relative to the motor shaft 92. Because the machined surface 74 can be used in positively locating other types of component housings relative to the end shield and the motor shaft 92, the pump housing 56 of the illustrative embodiment of the invention is shown only schematically and in dashed lines in FIG. 2.

The rotating component 126 with which the subject matter of the invention is employed in the illustrative embodiment is a pump impeller. However, as explained earlier, the rotating component could be a fan, a pulley or some other component that is rotated with a motor shaft in use. Because various different rotating components may be employed with the apparatus of the invention and the method of the invention, the impeller 126 is shown only schematically in FIG. 2. The impeller 126 is shown with internal threading 128 that is employed in mounting the impeller on the shaft distal end 104. The impeller 126 is mounted on the shaft with the impeller engaging directly with the distal end 116 of the tubular sleeve spacer 112. In variant embodiments of the impeller or other rotating components used with the subject matter of the invention, a washer 132 shown in dashed lines in FIG. 2 could be positioned between the component and the sleeve distal end 116. In such a situation, the washer 132 would then engage directly with the sleeve distal end 116 and the impeller 126 would engage directly with the washer on the opposite side of the washer from the sleeve. With the sleeve length 118 positioning the sleeve distal end 116 at a predetermined or set distance relative to the shaft 92 and the end shield 68 of the motor housing, the direct engagement of the impeller 126 or its associated washer 132 with the sleeve distal end 116 positively positions the impeller relative to the shaft and the motor housing.

With the sleeve 112 assembled onto the motor shaft 92 and the sleeve proximal end 114 engaging against the bearing 78 on the opposite side of the bearing from the retaining ring 96, the retaining ring 96 and the sleeve proximal end 114 perform the functions of the prior art retainer rings 42, 44 that located and held the shaft in its axial position relative to the bearing and the motor housing. Thus, the use of the sleeve 112 permits the elimination of the second annular groove 38 and its associated retainer ring 144 and thereby reduces manufacturing costs of the motor. The predetermined length 118 of the sleeve between its proximal end 114 and its distal end 116 allows the sleeve distal end 116 to function as the third annular groove 46 and its associated retainer ring 48 of the prior art in positively locating the machined surface 74 on the housing end shield 68, in positively locating the pump housing 56 relative to the motor shaft 92, and in positively locating the rotating component or impeller 126 on the shaft 92 relative to the pump housing 56 and the shaft. Thus, use of the sleeve 114 eliminates the need for the second and third retaining rings 44, 48 and their associated shaft grooves 38, 46 and thereby reduces manufacturing cost of the motor. The sleeve distal end 116 will also remain in its position relative to the shaft when the impeller 126 or other rotating component is mounted onto the distal end of the shaft.

The spacer sleeve 112 of the invention eliminates the problem of a retainer ring coming out of its shaft groove as the pump impeller is assembled onto the shaft. It also eliminates the problem of the impeller becoming improperly positioned in the pump housing, and eliminates the problem of the machined surface on the motor housing being incorrectly positioned which could result in the pump housing being improperly positioned relative to the motor shaft and the impeller. The spacer sleeve also functions to maintain the relative positions of the bearing and the shaft and eliminates one of the two annular shaft grooves and their associated retainer rings employed on the prior art motor shaft to maintain the relative positions of the bearing and shaft, resulting in a cost reduction in the manufacturing of the motor.

While the present invention has been described by reference to a specific embodiment, it should be understood that modifications and variations of the invention may be constructed without departing form the scope of the invention defined in the following claims.

What is claimed:

1. An apparatus that positively locates a rotating component on a rotary device, the apparatus comprising:
   a shaft projecting from the rotary device, the shaft being supported by the rotary device for rotation of the shaft relative to the rotary device;
   a rotating component mounted on the shaft outside the rotary device for rotation of the rotating component with the shaft; and,
   a spacer mounted on the shaft between the rotary device and the rotating component, the spacer having a predetermined length that positively locates the rotating component on the shaft relative to the rotary device.

2. The apparatus of claim 1, further comprising:
   the spacer being mounted on the shaft operatively engaging with the rotary device and the rotating component.

3. The apparatus of claim 1, further comprising:
   the spacer being a tubular sleeve having opposite proximal and distal ends and having the predetermined length between the proximal and distal ends of the sleeve and a center bore extending through the sleeve from the proximal end to the distal end, the shaft extending through the center bore, the sleeve proximal end operatively engaging with the rotary device and the sleeve distal end operatively engaging with the rotating component.

4. The apparatus of claim 3, further comprising:
   the sleeve having an interior surface that surrounds the center bore and engages around the shaft.

5. The apparatus of claim 1, further comprising:
   the rotary device having a bearing supporting the shaft and the spacer engaging directly with the bearing.

6. The apparatus of claim 5, further comprising:
   a ring surface on the shaft, the ring surface engaging directly with the bearing on an opposite side of the bearing from the spacer.

7. The apparatus of claim 6, further comprising:
   the spacer being a tubular sleeve having opposite proximal and distal ends and having the predetermined length between the proximal and distal ends of the sleeve and a center bore extending through the sleeve from the proximal end to the distal end, the shaft extending through the center bore, the sleeve proximal end engaging directly with the bearing and the sleeve distal end operatively engaging the rotating component.

8. The apparatus of claim 7, further comprising:
   a washer mounted on the shaft between the sleeve and the rotating component with the sleeve engaging directly with the washer on one side of the washer and the rotating component engaging directly with the washer on an opposite side of the washer from the sleeve.

9. The apparatus of claim 5, further comprising:
   an annular groove in the shaft adjacent the bearing and a retaining ring in the annular groove and engaging directly with the bearing on an opposite side of the bearing from the spacer, and the shaft having no other annular grooves with retaining rings in the grooves between the bearing and the rotating component.

10. The apparatus of claim 9, further comprising:
    the spacer being a tubular sleeve having opposite proximal and distal ends and having the predetermined length between the proximal and distal ends of the sleeve and a center bore extending through the sleeve from the proximal end to the distal end, the shaft extending through the center bore, the sleeve proximal end engaging directly with the bearing and the sleeve distal end operatively engaging the rotating component.

11. The apparatus of claim 10, further comprising:

a washer mounted on the shaft between the sleeve and the rotating component with the sleeve engaging directly with the washer on one side of the washer and the rotating component engaging directly with the washer on an opposite side of the washer from the sleeve.

12. The apparatus of claim 5, further comprising:

an annular groove in the shaft adjacent the bearing and a retaining ring in the annular groove and engaging directly with the bearing on an opposite side of the bearing from the spacer, and the spacer being a tubular sleeve having opposite proximal and distal ends and having the predetermined length between the opposite proximal and distal ends of the sleeve, and a center bore extending through the sleeve from the proximal end to the distal end, the shaft extending through the center bore, the sleeve proximal end engaging directly with the bearing and the sleeve distal end operatively engaging the rotating component.

13. The apparatus of claim 12, further comprising:

a washer mounted on the shaft between the sleeve and the rotating component with the sleeve engaging directly with the washer on one side of the washer and the rotating component engaging directly with the washer on an opposite side of the washer from the sleeve.

14. The apparatus of claim 1, further comprising:

the rotary device having an end shield with the shaft passing through the end shield, a machined surface on the end shield extending around the shaft, and the spacer being a tubular sleeve having opposite proximal and distal ends and having the predetermined length between the opposite proximal and distal ends of the sleeve, and a center bore extending through the sleeve from the proximal end to the distal end, the shaft extending through the center bore, the sleeve proximal end operatively engaging with the rotary device and the sleeve predetermined length positively locating the sleeve distal end relative to the end shield machined surface.

15. An apparatus that positively locates a machined surface on a rotary device, the apparatus comprising:

a machined surface on the rotary device;

a shaft projecting from the rotary device, the shaft being supported by the rotary device for rotation of the shaft relative to the rotary device;

a spacer mounted on the shaft, the spacer having a predetermined length with opposite proximal and distal ends, the spacer proximal end operatively engaging the rotary device and the spacer predetermined length positioning the spacer distal end outside the rotary device at a set distance from the machined surface on the rotary device and thereby positively locating the machined surface on the rotary device.

16. The apparatus of claim 15, further comprising:

the spacer being a tubular sleeve having the predetermined length, the spacer proximal and distal ends being opposite proximal and distal ends of the sleeve, the sleeve having a center bore extending through the sleeve from the proximal end to the distal end, the shaft extending through the center bore, the sleeve proximal end operatively engaging the rotary device whereby the predetermined length of the sleeve between the proximal end and the distal end positively locates the machined surface on the rotary device relative to the sleeve distal end.

17. The apparatus of claim 16, further comprising:

the rotary device having a bearing supporting the shaft and the sleeve proximal end engaging directly with the bearing.

18. The apparatus of claim 17, further comprising:

a ring surface on the shaft, the ring surface engaging directly with the bearing on an opposite side of the bearing from the sleeve.

19. The apparatus of claim 17, further comprising:

an annular groove in the shaft adjacent the bearing and a retaining ring in the annular groove, the retaining ring engaging directly with the bearing on an opposite side of the bearing from the sleeve.

20. The apparatus of claim 15, further comprising:

the rotary device having an end shield with the shaft passing through the end shield and the machined surface on the end shield extending around the shaft.

21. A method of positively locating a rotating component on a shaft of a rotary device relative to the rotary device, the method comprising:

providing a tubular spacer sleeve with opposite proximal and distal ends, and a predetermined length between the proximal and distal ends, and with a center bore extending through the sleeve from the proximal end to the distal end, positioning the sleeve on the shaft of the rotary device with the sleeve proximal end operatively engaging with the rotary device; and positioning the rotating component on the shaft of the rotary device with the sleeve distal end operatively engaging with the rotating component outside the rotary device and thereby positively locating the rotating component on the shaft relative to the rotary device.

22. The method of claim 21, further comprising:

providing a bearing on the rotary device supporting the shaft for rotation and directly engaging the sleeve proximal end with the bearing.

23. The method of claim 22, further comprising:

providing a ring surface on the shaft and engaging the ring surface directly with the bearing on an opposite side of the bearing from the sleeve.

24. The method of claim 22, further comprising:

positioning a washer on the shaft of the rotary device and engaging the washer directly with the sleeve distal end on one side of the washer and engaging the washer directly with the rotating component on an other side of the washer.

25. The method of claim 22, further comprising:

providing an annular groove in the shaft, positioning a retaining ring in the groove and positioning the bearing on the shaft engaging directly with the retaining ring.

26. The method of claim 21, further comprising:

positively locating a machined surface on the rotary device by machining a surface on the rotary device at a predetermined distance from the sleeve distal end.

27. The method of claim 26, further comprising:

machining the surface on the device as a flat, annular surface that extends around the shaft.

* * * * *